United States Patent [19]

Amos

[11] 3,806,257

[45] Apr. 23, 1974

[54] OPERATOR VIEWING OPTICS FOR A SLIDE CLASSIFICATION SYSTEM

[75] Inventor: Lynn G. Amos, Raleigh, N.C.

[73] Assignee: Corning Glass Works, Corning, N.Y.

[22] Filed: May 4, 1973

[21] Appl. No.: 357,086

[52] U.S. Cl. ............ 356/201, 350/33, 350/152, 350/173, 350/286
[51] Int. Cl. ............................................ G01n 21/60
[58] Field of Search ......... 350/14, 19, 34, 152, 173, 350/286, 287, 204; 356/39

[56] References Cited
UNITED STATES PATENTS

| | | | |
|---|---|---|---|
| 1,883,019 | 10/1932 | Shore | 350/287 |
| 2,314,392 | 3/1943 | Dimmick | 350/204 X |
| 2,408,772 | 10/1946 | Glasser | 350/14 |
| 3,714,372 | 1/1973 | Rosen et al. | 356/39 X |

Primary Examiner—Ronald L. Wibert
Assistant Examiner—Matthew W. Koren
Attorney, Agent, or Firm—Walter S. Zebrowski

[57] ABSTRACT

In a system producing an electrical output representing the characteristics of a blood smeared slide, an optical system permits an operator to comfortably view the slide while it is being intensely illuminated. A television type detector produces the electrical output representing the optical characteristics of the blood on the slide. This detector requires that a very intense source of light be applied to the slide. In order for the operator to simultaneously view the slide a duplex beam splitter is inserted in the light path. A first prism in the beam splitter diverts a small percentage of the intense light to the operators viewing eye pieces. The first prism is a 30°–60°–90° prism having an index of refracton such that the reflection from the second surface is directed out of the prims and away from the viewing eye piece to avoid ghost images. A second prism having the same geometry and index of refraction re-establishes proper direction of the light beam between the slide and the detector. The small portion of light directed from the first prism to the viewing eye piece is predominantly polarized in one direction. The degree of polarization is easily calculated by Fresnell's law. A linear polarizer between the first prism and the eye piece is adjustable to provide continuously variable light attenuation. Adjustment of the linear polarizer through 90° rotation is sufficient to achieve the full light attenuation range.

5 Claims, 3 Drawing Figures

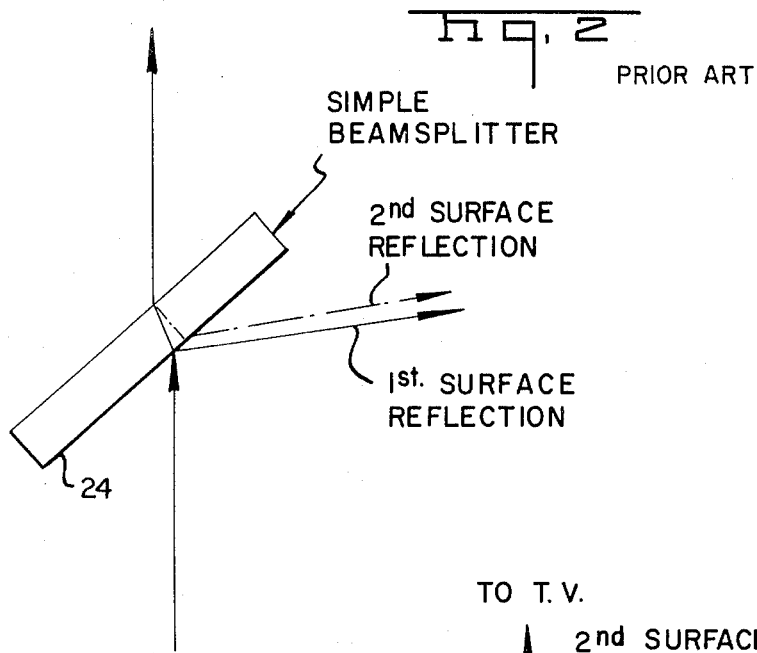
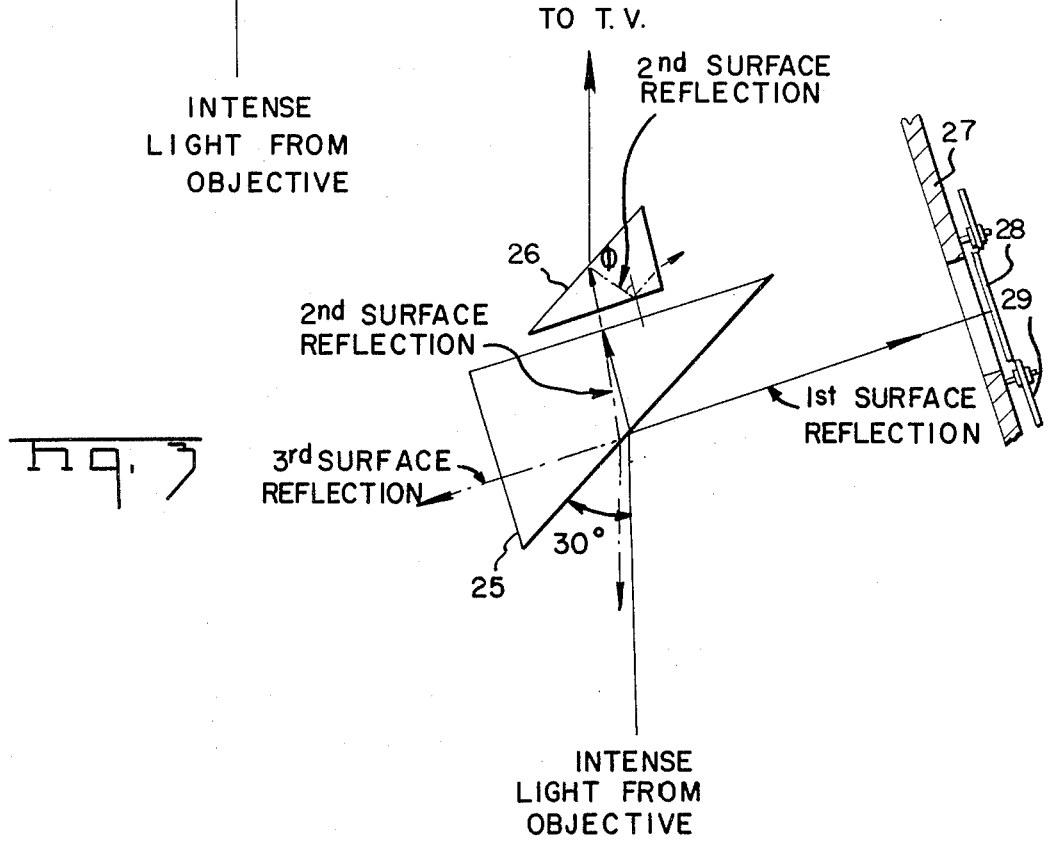

OPERATOR VIEWING OPTICS FOR A SLIDE CLASSIFICATION SYSTEM

BACKGROUND OF THE INVENTION

This invention relates to systems for analyzing laboratory slides and more particularly to a system which allows the operator to comfortably view a blood smear while it is subjected to intense illumination.

In the analysis of blood samples, the blood is smeared on a laboratory slide and the smear is stained. By counting the leukocytes on the stained smear, laboratory technicians perform what is referred to as a white blood cell differential. Automation of this differential has significant economic impact because the differential is performed so frequently at every hospital. A thesis by J. W. Backus, "An Automated Classification of the Peripheral Blood Leukocytes by Means of Digital Image Processing," University of Illinois, Chicago, 1971, describes one automated system.

In a system developed by my co-employees, a scanning unit (in this case a T.V. camera) linearly sweeps a vidicon target subjected to intense illumination which passes through the smeared slide. Such a system is described in copending application Ser. No. 353,004 filed Apr. 20, 1973, Douglas A. Cotter, Digitized Memory.

SUMMARY OF THE INVENTION

In accordance with this invention a duplex beam splitter diverts to the operator's eye piece a small portion of the intense light applied to a laboratory slide in an automated classification system. Further in accordance with the invention the light diverted to the operator's eye piece is easily regulated to a desired comfort level.

The duplex beam splitter includes a first prism which reflects the small portion of the light from its first surface to the operator's eye piece. Because of the geometry of the prism, the second surface reflection is directed out of the prism away from the viewing eye piece so that is does not form a ghost image. A second prism is placed a short distance from the first prism to re-establish proper direction of the intense light beam and prevent isomorphism in the focused image.

The angle of incidence of the intense beam on the first prism produces a reflection that is predominantly polarized in one direction in accordance with Fresnell's law. This partial polarization enables the use of a simple linear polarizer as a continuously variable light attenuator. This provides a simple regulator which the operator can use to get a particular comfort level in the portion of the beam which he is viewing.

The subject invention allows the operator to comfortably view a slide while it is being intensely illuminated at constant brightness for scanning by a T.V. type of detector. The components of the invention fit well within the rather limited space available between the high power objective and the viewer's binocular eye pieces.

The foregoing and other objects, features and advantages of the invention will be better understood from the following more detailed description and appended claims.

DESCRIPTION OF THE DRAWINGS

FIG. 2 shows the reflection produced in a simple beam splitter; and

FIG. 3 shows the reflections in the duplex beam splitter of this invention.

DESCRIPTION OF A PARTICULAR EMBODIMENT

Figure 1:
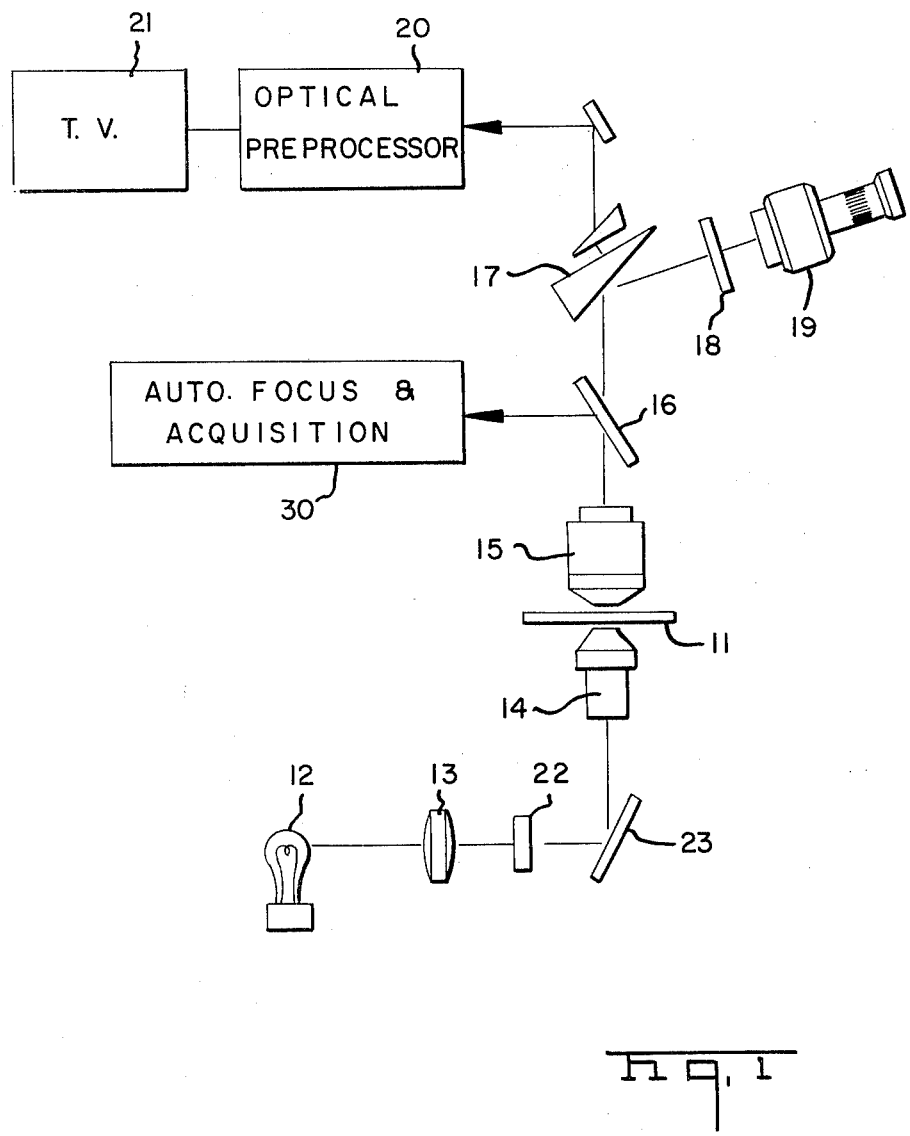
FIG. 1 shows the optical path of a system for scanning slides.

FIG. 1 shows the entire optical chain for a system for scanning and counting leukocytes on a blood smeared slide 11. Light from the lamp 12 passes through condenser lenses 13 and 14 and through the slide 11. The light is collected by the objective 15 and passes through a first beam splitter 16. This first beam splitter reflects 40 percent of the light to the automatic focus and acquisition subsystem 30. The remainder of the light is transmitted to the duplex beam splitter 17. The duplex beam splitter reflects 1½ percent of the light through the linear polarizer 18 to the operator eye pieces 19. The remainder of the light is directed to the optical preprocessor 20 and to the television type detector 21. This scans the light and the resultant electrical signals are stored as an image classification.

Light requirements for the television type detector and for the focus and acquisition system are almost two orders of magnitude larger than the level required for comfortable operator viewing. In one embodiment, the lamp 12 is a 25 watt halogen cycle incandescent lamp. The light is so intense as to require a heat filter 22 and a cold mirror 23 in the condensing path so as to protect other optical elements from unnecessary heat. The lamp must be regulated to a particular flux value to assure reliable television image processing. The duplex beam splitter 17 of this invention extracts a small percentage of this intense light.

A simple beam splitter is not suitable for use for the reasons shown in FIG. 2. The conventional beam splitter 24 splits off the desired light at the first reflecting surface. However, a small amount of light (approximately one-half percent) is reflected from the second surface. The second surface reflection is sufficient to form a ghost image in the operator's eye piece. Even the best anti-reflection coating would not suppress the second surface ghost image.

FIG. 3 shows how the duplex beam splitter of this invention suppresses the second surface reflection. The first prism 25 is a 30°–60°–90° prism having an index of refraction of 1.73. The intense light has a path at a 30° angle to the prism. About 1½ percent of the light is reflected to the operator's eye piece while the remaining 98½ percent of the light is refracted into the prism. The choice of a 30° incident beam produces a first surface reflection that is predominantly polarized one direction in accordance with Fresnell's law. Because of this the simple linear polarizer 18 is capable of attenuating the beam applied to the operator's eye pieces. The linear polarizer is at maximum attenuation when it is perpendicular to the predominant polarization in the reflected light. Adjustment of the linear polarizer through 90° rotation is sufficient to achieve the full light attenuation range.

As the light exits the prism 25 a second surface reflection is generated. However, the second surface reflection is directed by Snell's law back down the light path to the lamp and out of the system. A very faint third surface reflection is generated but it also is directed out of the system.

A second prism 26 is placed a short distance from the first prism. The second prism re-establishes proper direction of the intense light beams and prevents isomorphism in the focused T.V. image. That is, each beam in the image must travel the same distance through air and glass. Otherwise the image is distorted. The second prism 26, which is of the same geometry and index or refraction as the first, prevents possible distortion. A second surface reflection is also generated as the light exits prism 26. This reflection is of sufficient magnitude to cause a ghost image if it were not directed out of the system. The reflected ray is directed out of the system as shown by total internal reflection as the glass-air interface. The angle $\phi$ shown is greater than the critical angle defined by Snell's law to predict total internal reflection. The ray exits the prism as shown but does not enter the entrance pupil 27 to the operator's eye pieces and hence no ghost image is observed.

FIG. 3 also shows a fixed plate 27 with a circular hole that serves as the entrance pupil for the observer's binoculars. The linear polarizer 28 is fixed to a linear polarizer holder 29 in wuch a way as to make all light going through the entrance pupil pass through the polarizer. The polarizer holder 29 is rotably mounted to the fixed plate 27. A portion of the holder is exposed to the operator so that the operator may turn the polarizer to the desired attenuation level.

The following are examplary specifications of prisms used in one embodiment of the invention. The first prism has geometry of 30°-60°-90°×5'. It has a diagonal length of 0.750 inches ±0.005 inches and a width of 0.750 inches ±0.005 inches. The prism is constructed of commercially available optical glass supplied by Corning Glass Works under the designation SF-10. Three faces are polished 60-40, five fringes flat. Two sides are fine ground.

The specification for the second prism are the same except that it has a diagonal length of 0.375 inches ±0.005 inches.

The surfaces of the first and second prisms which face each other across the small air gap are coated with magnesium fluoride. This is an anti-reflection coating.

It will be apparent that other geometries and indicies of refraction may be used. In general, the limits on the indicies of refraction of optical glass are between 1.45 and 2.10. The glass with an index of refraction of 1.73 is easily obtainable and is desirable for this reason. Given another index of refraction, it will be apparent that other geometries of the prisms will direct the unwanted reflections away from the viewer's eye piece in the same manner as previously described.

While a particular embodiment of the invention has been shown and described, there are modifications within the true spirit and scope of the invention. The appended claims are, therefore, intended to cover such modifications.

What is claimed is:

1. A system producing an electrical output representative of the optical characteristics of an analytical slide comprising:

a source of intense light directed through said slide;

a television type detector responsive to the light passing through said slide for producing said electrical signal representative of the characteristics of said slide;

a first prism in the light path between said slide and said detector, said first prism having a first and a second surface in the primary path of light between said slide and said detector, said first surface having an angle with respect to light from said slide which reflects a small portion of said light toward a viewing eye piece, said second surface having an angle which reflects light out of said prism and away from said viewing eye piece; and a second prism disposed between said first prism and said detector for re-establishing proper direction of the light beam between said slide and said detector, said second prism having a geometry that directs unwanted reflection out of the system by means of total internal reflection.

2. The system recited in claim 1 wherein said second prism has reflecting surfaces with the same geometry as that of said first prism.

3. The system recited in claim 1 wherein said first prism polarizes said small portion of light reflected from said first surface predominantly in one direction, said system further comprising:

a linear polarizer between said first prism and said eye piece, said linear polarizer being adjustable to provide continuously variable light attenuation.

4. The system recited in claim 1 wherein said first and said second prisms are 30°-60°-90° prisms having an index of refraction of approximately 1.73.

5. The system recited in claim 1 wherein said first and second prisms have an index of refraction between 1.45 and 2.10 and surface geometry such that light reflected from the second surface of said first prism is directed out of said prism and away from said eye piece.

* * * * *